(12) United States Patent
Hirakawa et al.

(10) Patent No.: US 9,039,196 B2
(45) Date of Patent: May 26, 2015

(54) IMAGE DISPLAYING APPARATUS HAVING PLANE MIRROR AT CONJUGATE TO IMAGE DISPLAYING ELEMENT

(71) Applicants: Makoto Hirakawa, Kanagawa (JP);
Hibiki Tatsuno, Kanagawa (JP);
Takanobu Osaka, Kanagawa (JP);
Yasuyuki Shibayama, Kanagawa (JP);
Kiichiro Nishina, Kanagawa (JP)

(72) Inventors: Makoto Hirakawa, Kanagawa (JP);
Hibiki Tatsuno, Kanagawa (JP);
Takanobu Osaka, Kanagawa (JP);
Yasuyuki Shibayama, Kanagawa (JP);
Kiichiro Nishina, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 123 days.

(21) Appl. No.: 13/664,830

(22) Filed: Oct. 31, 2012

(65) Prior Publication Data

US 2013/0107233 A1 May 2, 2013

(30) Foreign Application Priority Data

Oct. 31, 2011 (JP) .................... 2011-238707

(51) Int. Cl.
*G03B 21/28* (2006.01)
*H04N 9/31* (2006.01)
(Continued)

(52) U.S. Cl.
CPC ............. *G03B 21/28* (2013.01); *G03B 21/10* (2013.01); *H04N 9/3152* (2013.01); *G03B 21/008* (2013.01); *G03B 21/2066* (2013.01); *G02B 17/0816* (2013.01)

(58) Field of Classification Search
CPC ............. G03B 21/00; G03B 21/005–21/006; G03B 21/008; G03B 21/10; G03B 21/14; G03B 21/145; G03B 21/28; G03B 21/56; G03B 21/567; H04N 9/31; H04N 9/3141; H04N 9/3152; H04N 9/317; H04N 1/00909; H04N 5/64; G02B 5/08; G02B 5/10; G02B 17/008; G02B 17/0804; G02B 17/0816; G02B 17/082; G02B 17/0832; G02B 17/0836; G02B 17/0848; G02B 17/0884
USPC ................. 353/71, 77–79, 94, 98–99, 22, 73; 359/726–727, 729–731, 850, 857–859, 359/868–869
See application file for complete search history.

(56) References Cited

U.S. PATENT DOCUMENTS 6,631,994 B2 10/2003 Suzuki et al.
7,048,388 B2 5/2006 Takaura et al.
(Continued)

FOREIGN PATENT DOCUMENTS

JP 3727543 10/2005
JP 4210314 10/2008
(Continued)

OTHER PUBLICATIONS

U.S. Appl. No. 13/665,427, filed Oct. 31, 2012, Nishina, et al.
(Continued)

*Primary Examiner* — Jori S Reilly-Diakun
(74) *Attorney, Agent, or Firm* — Oblon, McClelland, Maier & Neustadt, L.L.P.

(57) ABSTRACT

An image displaying apparatus including a light source, an image displaying element configured to control exiting of incident light to display an image, an illumination optical system configured to illuminate the image displaying element with light exiting from the light source, and a projection optical system configured to project an image displayed on a display surface of the image displaying element, to provide an enlarged display. The projection optical system includes a lens optical system, a first mirror configured to reflect light transmitted through the lens optical system, and a second mirror configured to reflect light reflected from the first mirror toward the surface to be projected onto, and one of the mirrors is arranged at a position conjugate to the image displaying element, and wherein an optical surface of the one mirror is arranged to face vertically downward.

8 Claims, 11 Drawing Sheets

(51) Int. Cl.
*G02B 17/08* (2006.01)
*G03B 21/10* (2006.01)
*G03B 21/00* (2006.01)
*G03B 21/20* (2006.01)

(56) References Cited

U.S. PATENT DOCUMENTS

| | | | |
|---|---|---|---|
| 7,441,908 B2 * | 10/2008 | Takaura et al. | 353/99 |
| 7,509,046 B2 * | 3/2009 | Tochigi et al. | 396/386 |
| 7,631,975 B2 * | 12/2009 | Takaura et al. | 353/99 |
| 7,637,618 B2 * | 12/2009 | Takaura et al. | 353/37 |
| 7,637,621 B2 * | 12/2009 | Takaura et al. | 353/99 |
| 7,753,531 B2 | 7/2010 | Fujita et al. | |
| 7,857,458 B2 | 12/2010 | Fujita et al. | |
| 7,922,340 B2 | 4/2011 | Ohzawa | |
| 7,922,341 B2 * | 4/2011 | Takaura et al. | 353/99 |
| 8,025,415 B2 * | 9/2011 | Abe et al. | 353/70 |
| 8,052,283 B2 * | 11/2011 | Imaoka et al. | 353/78 |
| 8,052,290 B2 * | 11/2011 | Seki | 359/850 |
| 8,054,556 B2 * | 11/2011 | Chen et al. | 359/649 |
| 8,087,789 B2 * | 1/2012 | Amano et al. | 353/99 |
| 8,246,176 B2 * | 8/2012 | Adachi et al. | 353/98 |
| 2004/0156117 A1 * | 8/2004 | Takaura et al. | 359/651 |
| 2008/0068563 A1 * | 3/2008 | Abe et al. | 353/98 |
| 2008/0068564 A1 * | 3/2008 | Abe et al. | 353/98 |
| 2009/0091928 A1 | 4/2009 | Tatsuno | |
| 2009/0213470 A1 * | 8/2009 | Abe et al. | 359/649 |
| 2010/0020390 A1 * | 1/2010 | Dodoc | 359/364 |
| 2012/0019791 A1 * | 1/2012 | Abe et al. | 353/99 |
| 2012/0154768 A1 | 6/2012 | Tatsuno | |
| 2012/0162753 A1 | 6/2012 | Tatsuno | |
| 2014/0118818 A1 * | 5/2014 | Nishina et al. | 359/364 |

FOREIGN PATENT DOCUMENTS

| | | |
|---|---|---|
| JP | 4329863 | 6/2009 |
| JP | 2009-145672 | 7/2009 |
| JP | 2009-157223 | 7/2009 |

OTHER PUBLICATIONS

U.S. Appl. No. 13/665,503, filed Oct. 31, 2012, Nishina, et al.
U.S. Appl. No. 13/667,221, filed Nov. 2, 2012, Osaka, et al.
U.S. Appl. No. 13/669,079, filed Nov. 5, 2012, Tatsuno, et al.
U.S. Appl. No. 13/669,159, filed Nov. 5, 2012, Tatsuno, et al.

* cited by examiner

IMAGE DISPLAYING APPARATUS HAVING PLANE MIRROR AT CONJUGATE TO IMAGE DISPLAYING ELEMENT

BACKGROUND OF THE INVENTION

1. Field of the Invention

An aspect of the present invention may relate to an image displaying apparatus.

2. Description of the Related Art

Recently, an image displaying apparatus is known which may be capable of being placed extremely close to a screen surface (which is a surface to be projected onto of a screen and corresponds to an image surface) compared to conventional ones. Such an image displaying apparatus is called an ultra-short throw projector, etc. Objects of an ultra-short throw projector are, first, to avoid glare caused by projection light entering an eye of a presenter (an expositor or speaker, etc.) standing near a screen, and second, to prevent an audience listening to an explanation of a presenter from being affected by exhaust air or noise of a projector.

For a projection optical system included in an ultra-short throw projector, there are provided a simple extension of an angle of view of a conventional (coaxial or rotationally symmetric) projection optical system to reduce the distance thereof from a screen surface, use of a curved mirror (for example, see Japanese Patent No. 4329863 and Japanese Patent No. 3727543), etc. Herein, it may be possible for a method of extending an angle of view of a projection optical system to achieve an object of ultra-short throw as an extension of a conventional technique. However, it may be necessary for such a method to provide a lens with a large outer diameter near a screen, and hence, a projector may be large entirely. On the other hand, a method of using a curved mirror is compact while it may be possible to provide projection at an ultra-short distance.

An invention disclosed in Japanese Patent No. 4329863 is a method of arranging a concave mirror behind a lens optical system constituting a projection optical system for projection. On the other hand, an invention disclosed in Japanese Patent No. 3727543 is a method of arranging a convex mirror behind a lens optical system for projection. In any of the methods, it may be possible to conduct setting by merely arranging a lens(es) and a mirror(s) in order, and hence, it may be possible to increase the precision of arrangement of parts. However, a long distance between a lens optical system and a mirror may be necessary, and hence, a large projection optical system may be provided.

It is also proposed that it may be possible to reduce a distance between a lens and a mirror (for example, see Japanese Patent Application Publication No. 2009-157223 and Japanese Patent Application Publication No. 2009-145672). Inventions disclosed in Japanese Patent Application Publication No. 2009-157223 and Japanese Patent Application Publication No. 2009-145672 are to arrange a folding mirror to fold a long distance between a lens optical system and a mirror wherein miniaturization of an optical system is intended. Herein, an invention disclosed in Japanese Patent Application Publication No. 2009-157223 is to arrange a concave mirror and a convex mirror in order net to a lens optical system wherein miniaturization is intended. On the other hand, an invention disclosed in Japanese Patent Application Publication No. 2009-145672 is to arrange a plane mirror behind a concave mirror wherein miniaturization is intended.

However, a distance from an image displaying element to a curved mirror is long in an optical system disclosed in any of Japanese Patent Application Publication No. 2009-157223 and Japanese Patent Application Publication No. 2009-145672 (for example, "L1" in FIG. 4 of Japanese Patent Application Publication No. 2009-157223 is long). Accordingly, a length of an optical system body may interfere with reducing a distance from a screen to a projector body even further than conventional ones, and hence, there may be a limitation for an amount of protrusion of a projector body from a screen surface.

It is also proposed that such a constraint for "a size of an optical system itself" be solved (for example, see Japanese Patent No. 4210314). Japanese Patent No. 4210314 discloses a so-called vertical type projection optical system wherein a screen surface and a display surface of an image displaying element are perpendicular to each other. When such a vertical type is adopted, a length of a projection optical system itself may not provide a constraint for an amount of protrusion of a projector body from a screen surface, and hence, an ultra-short throw may be possible.

As result of actively studying miniaturization of such a vertical type projection optical system and an ultra-short throw with a throw ratio of 0.3 or less, it is found that it may be difficult for a configuration illustrated in FIG. 12 of Japanese Patent No. 4210314 to project a large format image even by an ultra-short throw. That is, it is found that it may be necessary to increase a divergence of light incident on a mirror system from a lens optical system or an optical system for imaging an intermediate image between an image displaying element and a screen surface may be preferable in order to project a large format image by an ultra-short throw.

However, as an intermediate image is imaged between an image displaying element and a screen surface, a problem described below may be caused. In an intermediate image method, a Digital Micromirror Device (DMD) as an image displaying element and an intermediate image are conjugate and the intermediate image and a screen surface are conjugate. Hence, as dust, etc., attaches to an optical element arranged near an intermediate image, enlargement thereof on and projection onto a screen surface may occur to provide an image defect. Such an image defect may degrade the quality of a display image.

For a countermeasure against such an image defect, it is also considered that no optical element is to be arranged near an intermediate image. However, such a matter may add a constraint to an optical path layout. That is, when there is a constraint on an optical path layout, it may be difficult to adopt a vertical type, and hence, miniaturization of an image displaying apparatus may be hindered, which may be unfavorable.

SUMMARY OF THE INVENTION

According to one aspect of the present invention, there may be provided an image displaying apparatus including a light source, an image displaying element configured to control exiting of incident light to display an image, an illumination optical system configured to illuminate the image displaying element with light exiting from the light source, and a projection optical system configured to project an image displayed on a display surface of the image displaying element onto a surface to be projected onto, to provide an enlarged display, wherein the projection optical system includes a lens optical system, a first mirror configured to reflect light transmitted through the lens optical system, and a second mirror configured to reflect light reflected from the first mirror toward the surface to be projected onto, wherein one of the first mirror and the second mirror is arranged at a position conjugate to the image displaying element, and wherein an optical surface of the one mirror is arranged to face in a vertically downward direction.

DETAILED DESCRIPTION OF THE PREFERRED EMBODIMENTS

A practical mode of an image displaying apparatus according to an embodiment of the present invention will be described with reference to the drawings below.

Additionally, as will be described below, a position of condensed light of a projection light beam with a large divergence is adjusted in an image displaying apparatus according to an embodiment of the present invention, whereby it may be possible to display a large format image on a screen at an ultra-short distance.

Figure 1:
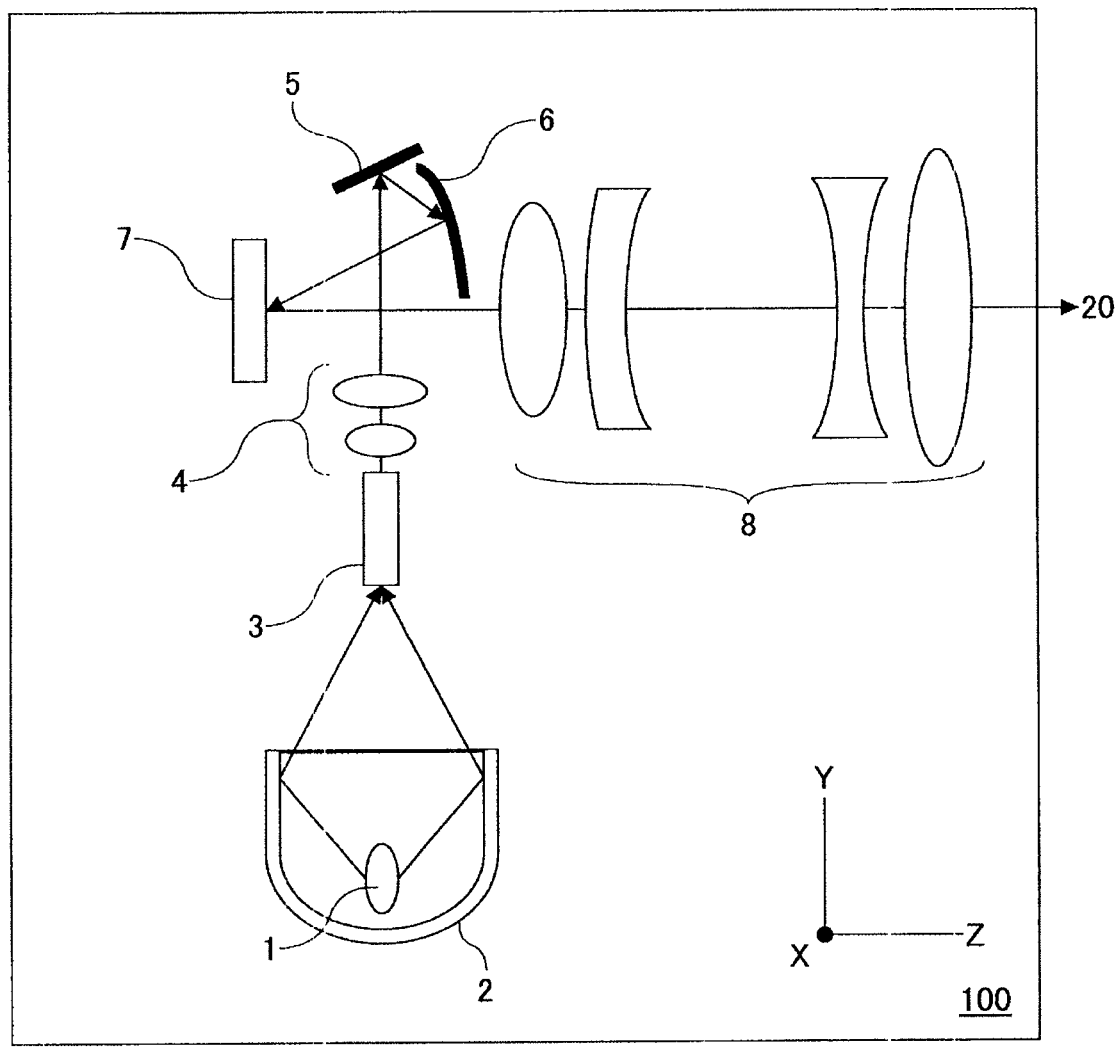
FIG. 1 is an optical arrangement diagram illustrating a practical mode of an image displaying apparatus according to an embodiment of the present invention.

FIG. 1 is an optical arrangement diagram illustrating a practical mode of an image displaying apparatus according to an embodiment of the present invention. A projector 100 which is an image displaying apparatus includes an illumination optical system for illuminating a DMD 7 which is a reflective image displaying element with light emitted from a lamp 1 which is a light source, and a projection optical system for projecting light reflected from the DMD 7 toward a screen 20 which is a surface to be projected onto (a surface to be projected onto of a screen).

In the following description(s), a direction of an optical axis of a projection optical system and a direction of an optical axis of an illumination optical system are a direction of a Z-axis and a direction of a Y-axis, respectively, while a direction orthogonal to both the direction of Z-axis and the direction of Y-axis is a direction of an X-axis.

Additionally, a DMD which is a reflective image displaying element is used as an example of an image displaying element for controlling exiting of incident light to display an image in a practical mode described below. However, an image displaying element included in an image displaying apparatus according to an embodiment of the present invention is not limited to a DMD but instead another image displaying element such as a liquid crystal panel may be used.

Herein, an illumination optical system will be described. Light emitted from the lamp 1 which is a light source is condensed onto an entrance port of an integrator rod 3 by a reflector 2. The integrator rod 3 is a light pipe formed into a tunnel-like shape by combining four mirrors. Light incident on the integrator rod 3 repeats reflection thereof at mirror surfaces within the integrator rod 3 to provide light with a uniform light quantity and no irregularity at an exit port of the integrator rod 3.

While the exit port of the integrator rod 3 is regarded as a surface light source with a uniform light quantity and no irregularity, a light source image of such a surface light source is produced on an effective image area of the DMD 7 via a lens for DMD illumination 4, a first folding mirror 5, and a second folding mirror 6. The lens for DMD illumination 4 is an optical element for efficiently illuminating an effective image area of the DMD 7. The first folding mirror 5 is a plane mirror. Furthermore, the second folding mirror 6 is a curved mirror (concave mirror).

Light exiting from the integrator rod 3 passes through a front of the lens for DMD illumination 4, is reflected by the first folding mirror 5 toward an obliquely lower right direction on a plane of paper of FIG. 1, and is directed toward the second folding mirror 6. Light reflected by the second folding mirror 6 illuminates a display surface of the DMD 7 and is reflected by a mirror within an effective image area of the DMD 7, and a reflected light beam which is an image projection light passes to a side of the second folding mirror 6 and enters a lens optical system 8 which constitutes a projection optical system. The lamp 1 through the second folding mirror 6 will be referred to as an illumination optical system.

By such an illumination optical system, the DMD 7 is illuminated with illumination light with no light quantity irregularity to provide a uniform illuminance distribution, and hence, a projection image which is an enlarged image thereof also has a uniform illuminance distribution.

The DMD 7 is a device composed of multiple micro-mirrors and it may be possible to change an angle of each micro-mirror within a range of +12° to −12°. For example, when an angle of a micro-mirror is −12°, a layout of each optical element is provided in such a manner that illumination light reflected by the micro-mirror enters a projection lens. Such a state will be referred to as an "on-state". Furthermore, when an angle of a mirror is +12°, a layout of each optical element is provided in such a manner that illumination light reflected by the micro-mirror does not enter a projection lens. Such a state will be referred to as an "off-state".

A micro-mirror of the DMD 7 corresponds to a pixel of an image to be displayed on a surface to be projected onto. Hence, a tilt angle of each micro-mirror of the DMD 7 is controlled whereby it may be possible to project projection light necessary for forming an image to be displayed on a screen 20 (projection image light) via the projection optical system.

Additionally, the projection optical system includes a lens optical system 8 and a mirror optical system, although only the lens optical system 8 is illustrated in FIG. 1. The lens optical system 8 includes a projection lens composed of plural lenses and a lens barrel for holding such a projector lens (which is not illustrated in the figure). Furthermore, a mirror optical system which is not illustrated includes a mirror for reflecting a projection light beam from a projection lens toward the screen 20.

Practical Example 1

Figure 2:
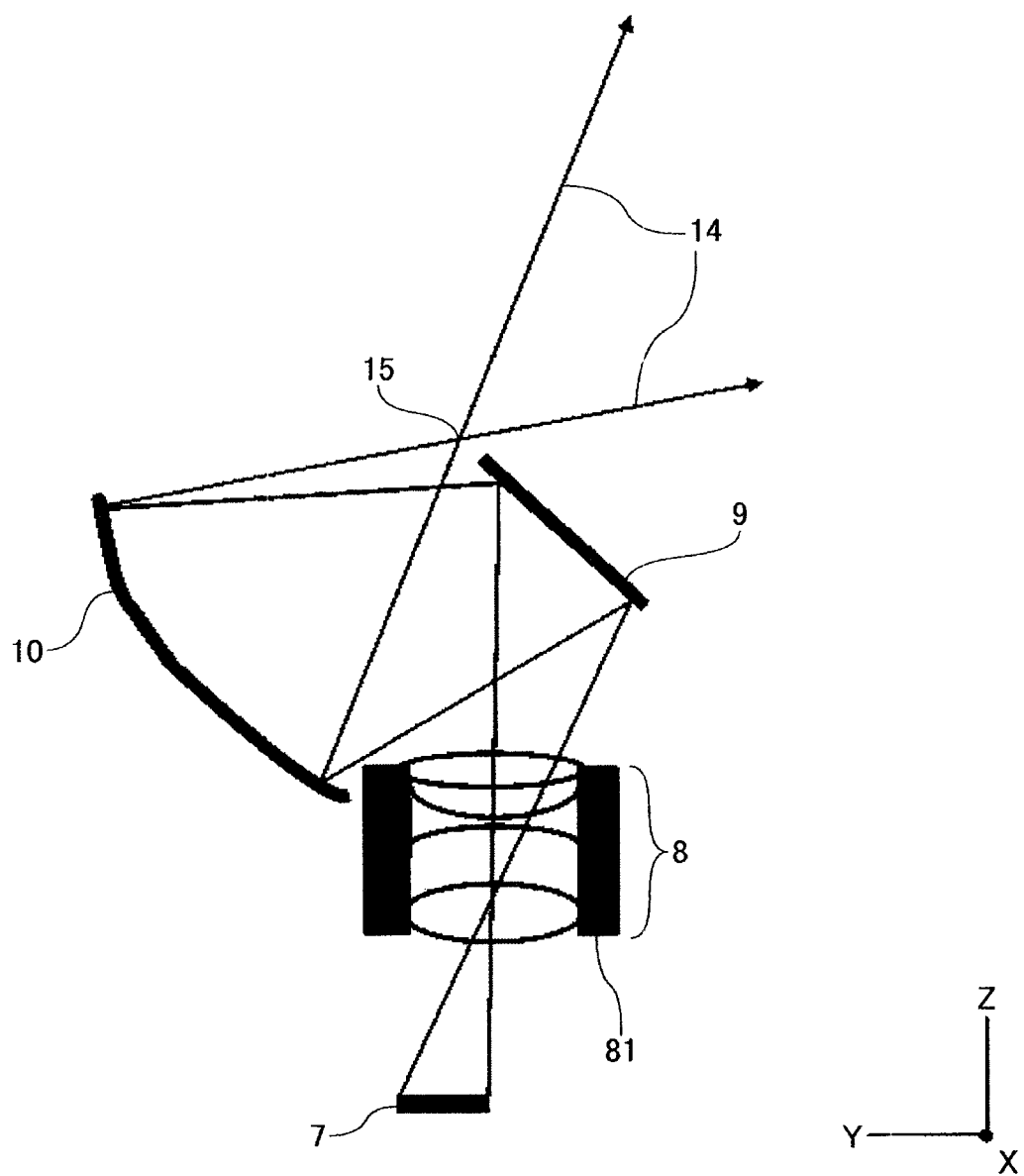
FIG. 2 is an enlarged view of an essential part of a projection optical system included in the image displaying apparatus.

A practical example of an image displaying apparatus according to an embodiment of the present invention will be described below. FIG. 2 is an enlarged view of an essential part of a projection optical system in an image displaying apparatus according to the present practical example. Additionally, illustration of an illumination optical system is omitted in FIG. 2. FIG. 2 illustrates that all of micro-mirrors included in a DMD 7 are provided at on-state, at which an effective image area is entirely projected onto a screen 20 (which is not illustrated in the figure). In FIG. 2, a projection light beam 14 is represented by two rays which enter a lens optical system 8 from edge portions of an effective image area of the DMD 7, pass through a first mirror 9 and a second mirror 10 which constitute a mirror optical system, and arrive at a screen 20 (which is not illustrated in the figure).

The lens optical system 8 is composed of plural lenses contained in a lens barrel 81. The projection light beam 14 converges inside the lens barrel 81 and subsequently diverges to be directed to the first mirror 9. The first mirror 9 is a plane mirror, wherein an optical surface thereof is arranged to be directed in a vertically downward direction.

Additionally, the first mirror 9 is not limited to a plane mirror. However, if the first mirror is a convex mirror, the projection light beam 14 reflected from the first mirror further increases in divergence thereof. As a result, a likelihood is increased that the projection light beam 14 reflected from the first mirror is subjected to light vignetting (shading) by, for example, impinging on the lens barrel 81, etc., on the route to the second mirror 10. Hence, it is desirable for the first mirror to be a plane mirror or a concave mirror.

Figure 4:
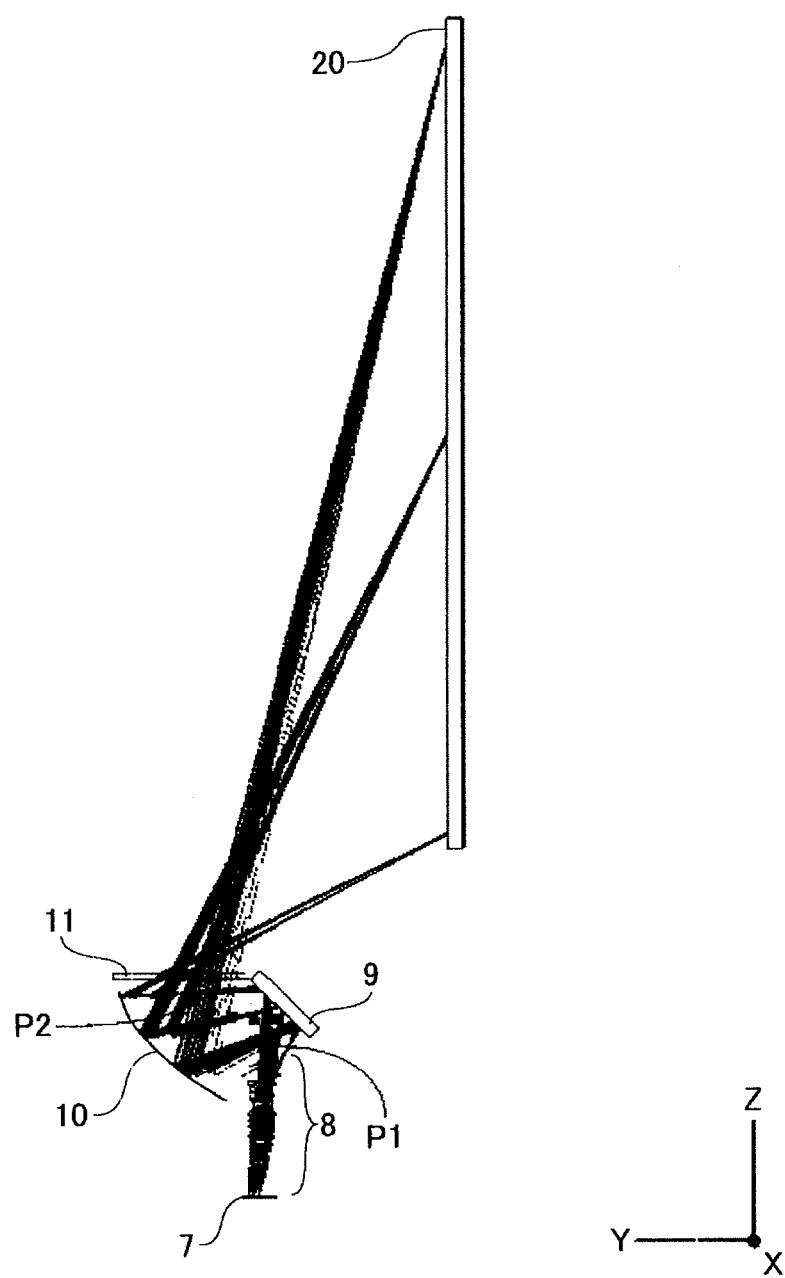
FIG. 4 is a light ray diagram illustrating a position of an intermediate image formed by a dens optical system constituting the projection optical system.

Herein, an intermediate image imaged and formed by the lens optical system 8 will be described. FIG. 4 is a light ray diagram illustrating a trajectory of light to be projected by a projection optical system. In the figure, P1 is an intermediate image formed by a pixel furthest from an optical axis of a lens optical system 8 among pixels of a DMD 7 and P2 is an intermediate image formed by a pixel closest to the optical axis of the lens optical system 8. As illustrates in FIG. 4, the intermediate image formed by the lens optical system 8 is formed to interpose a first mirror 9. In other words, a projection optical system is arranged or set in such a manner that an intermediate image formed by the lens optical system 8 interposes the first mirror 9. Additionally, an intermediate image interposing a first mirror means that portions of an intermediate image are optically present at both a light source side and screen side of a first mirror. Herein, "optical" means when viewed from a light source along a direction of travel of a light ray.

Additionally, at least either one of the first mirror 9 and a second mirror 10 in an embodiment of the present invention may be interposed by an intermediate image formed by the lens optical system 8.

If contaminant or dust attaches to an optical surface of the first mirror 9 near the intermediate image formed by the lens optical system 8, such contaminant, etc., may be reflected in a screen so that degradation of image quality of a display image may be caused. Hence, it is desirable to prevent contaminants, etc., from entering an inside of a housing for a body of a projector 100. However, it may be difficult to completely prevent contaminants, etc., from entering through a gap in the housing for the body of the projector 100 into an inside of the housing.

Herein, an optical surface of the first mirror 9 is arranged to be directed in a vertically downward direction as described above, whereby even if a contaminant, etc., enters through a gap in the housing, such contaminant, etc., falls in a vertically downward direction due to a gravitational force. As a result, contaminants, etc., may hardly attach to or be deposited on an optical surface of the first mirror, so that it may be possible to prevent or reduce degradation of an image quality of a display image on a screen 20 and it may be possible to stabilize such an image quality.

It may be necessary for the second mirror 10 for reflecting a projection light beam 14 reflected from the first mirror 9 toward the screen 20 to be a concave mirror. If the second mirror is a plane mirror or a convex mirror, a reflected projection light beam 14 may be diffused so as not to be reflected toward the screen 20.

Thus, the first mirror 9 is a plane mirror or a concave mirror and the second mirror 10 is a concave mirror. As a result, the projection light beam 14 reflected from the second mirror 10 is condensed between the second mirror 10 and the screen 20, then diffused, and projected onto the screen 20 so that it may be possible to display an image.

Herein, as two mirrors such as the first mirror 9 and the second mirror 10 have power, a display mirror on the screen 20 may readily be affected by a relative positional displacement of each mirror. Hence, one mirror (first mirror 9) of the two mirrors is a plane mirror, whereby it may be possible to reduce degradation of a display image caused by a relative positional displacement between the two mirrors.

In order to provide an ultra-short distance between the projector 100 and the screen 20 and display a large format image, it may be necessary to increase a divergence of a light beam incident on a mirror optical system from the lens optical system 8 so that a reflected projection light beam 14 is condensed by the second mirror 10 constituting a mirror optical system. Furthermore, it may be necessary for a position of such light condensation to be a position close to the second mirror 10 far forward of the screen 20. This is because it may not be possible for the projection light beam 14 from the projector placed at an ultra-short distance to diverge sufficiently to display a large image on the screen 20 unless a position of light condensation is a position close to the second mirror 10 far forward of the screen 20.

Figure 3:
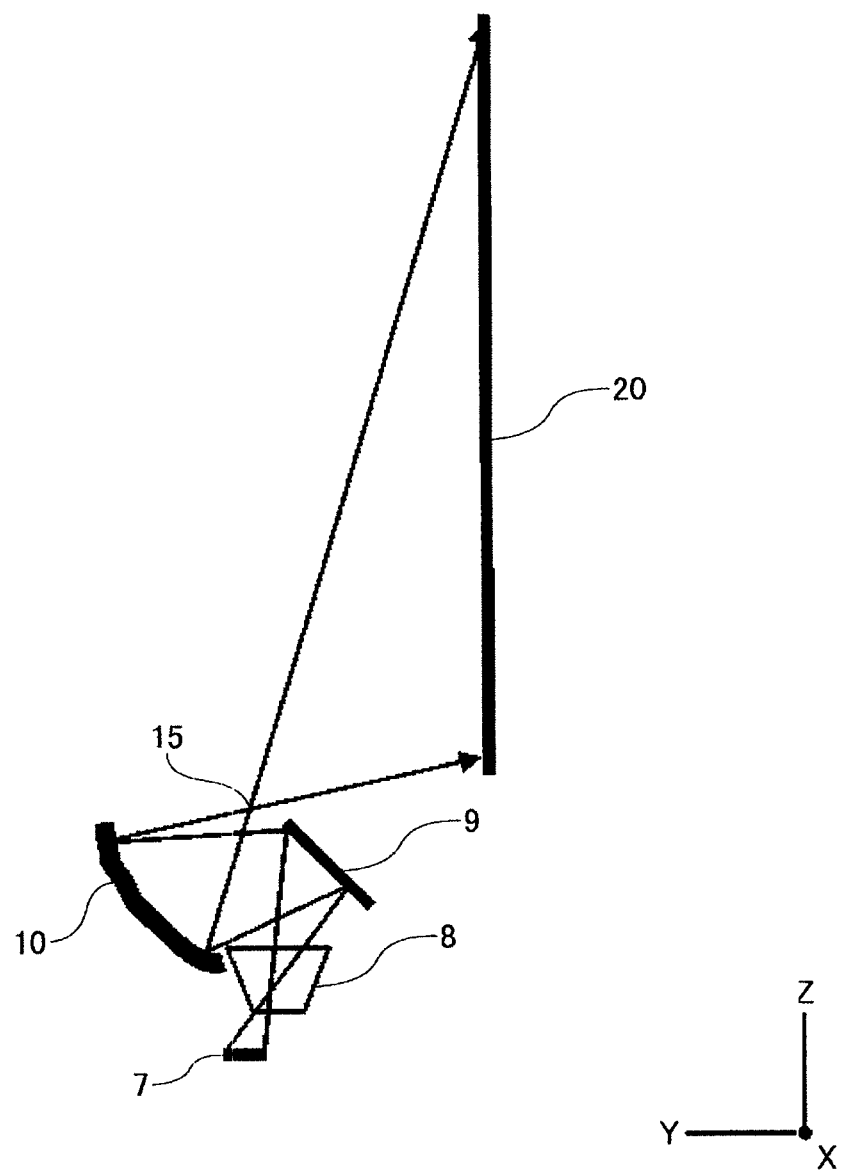
FIG. 3 is an optical path diagram illustrating an optical path of light projected by the projection optical system.

For example, as illustrated in FIG. 3, when a position of light condensation 15 is a position far forward of a screen 20 and close to a second mirror 10, a projection light beam diffuses sufficiently even if there is a short distance between a projector 100 and the screen 20. As a result, it may be possible for the projector 100 to display an increasingly enlarged image over an entirety of the screen 20.

Additionally, as illustrated in FIG. 3, a display surface (an upside face of the plane of the paper in the figure) of a DMD 7 and a surface to be projected onto of the screen 20 are orthogonal or generally orthogonal thereto.

A position of light condensation will be described further. It is desirable for the position of light condensation 15 to be far forward the screen 20, that is, close to the second mirror 10, but it may be unfavorable to be too close to the second mirror 10. It is desirable for the position of light condensation 15 to be a position closer to a first mirror 9 than the second mirror 10, which is a concave mirror. The reason(s) thereof will be described below, by using FIG. 5.

Figure 5:
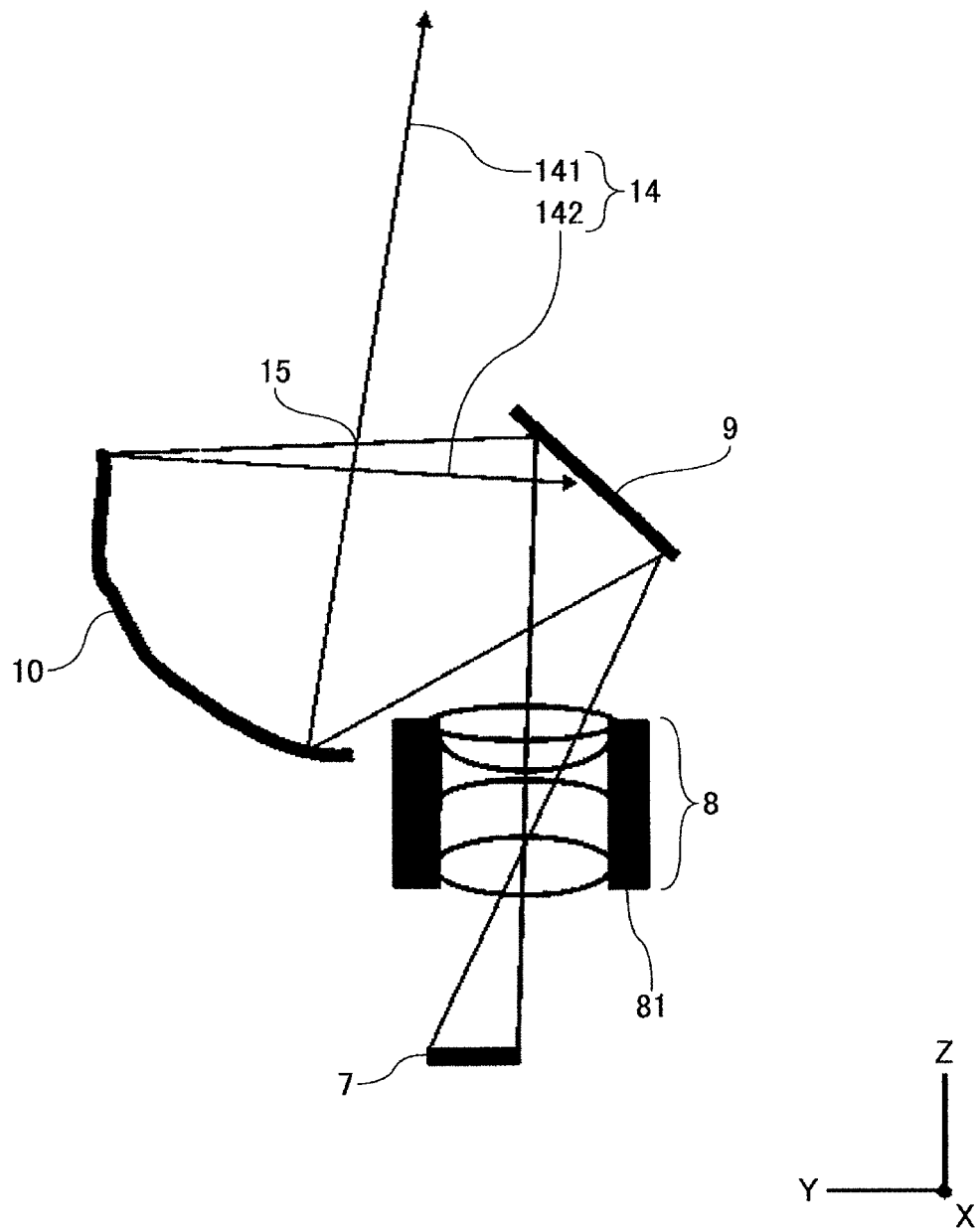
FIG. 5 is an enlarged view of an essential part of another projection optical system.

FIG. 5 is an enlarged view of an essential part of a projection optical system, and illustrates an example in a case where a position of light condensation 15 is closer to a second mirror 10 than a first mirror 9. A projection light beam 14 condenses at the position of light condensation 15 and then diffuses drastically. Hence, when the position of light condensation 15 is not present near the first mirror 9 but is close to a side of the second mirror 10 as illustrated in FIG. 5, the first mirror 9 is configured to be arranged on an optical path of the projection light beam 14 diffused from the position of light condensation 15. As a result, a portion of the projection light beam 14 is subject to "vignetting" caused by the first mirror 9.

Figure 6:
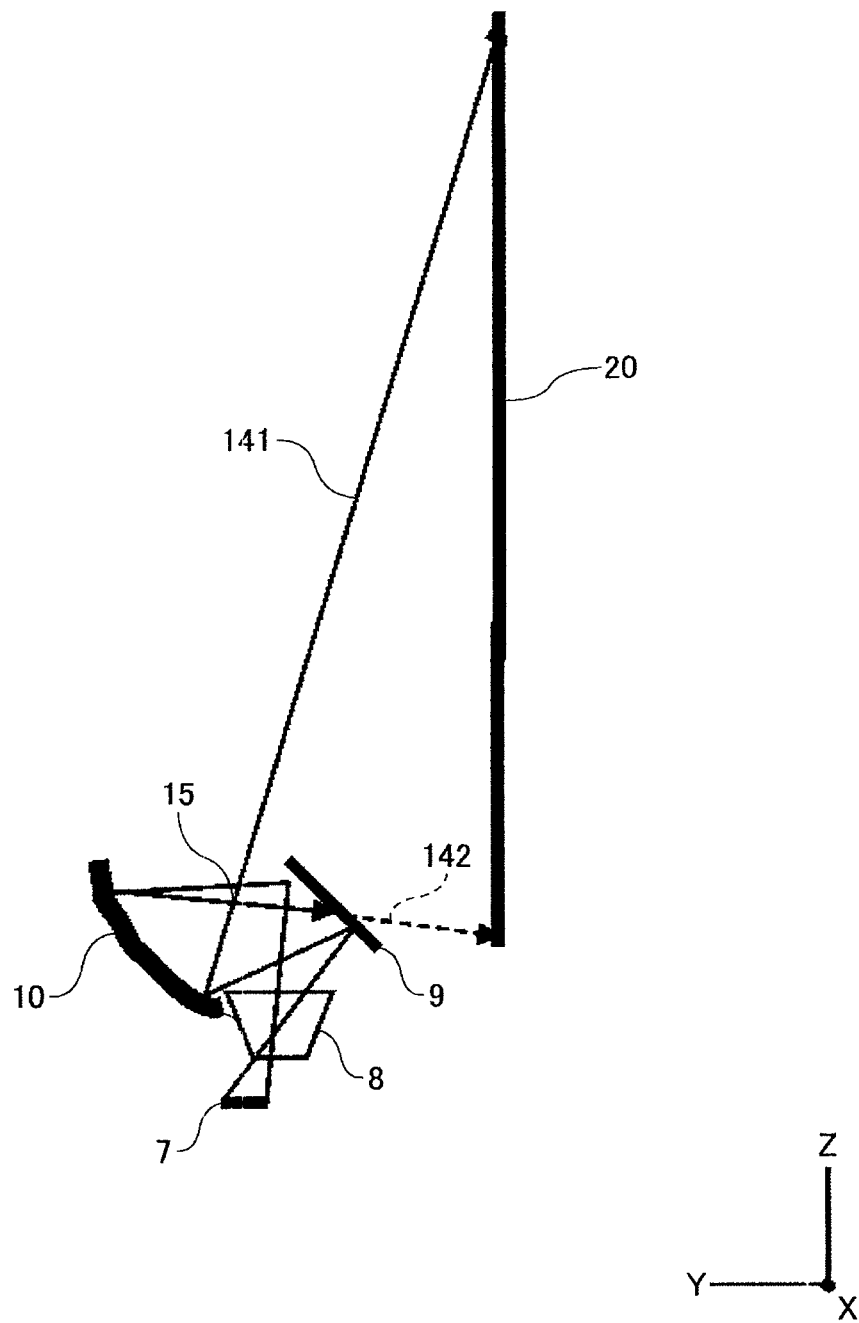
FIG. 6 is an optical path diagram illustrating an optical path of light projected by the projection optical system in FIG. 5.

FIG. 6 is an optical path diagram illustrating an aspect of light projected by the projection optical system in FIG. 5. As illustrated in FIG. 6, a projection light beam 14 reflected from a second mirror 10 and directed toward a screen 20 is considered by paying attention to each of a projection light beam 141 impinging on an edge portion of the screen 20 and a projection light beam 142 impinging on an edge portion at an opposite side. The projection light beam 141 is reflected by the second mirror 10, passes through a position of light condensation 15, and is projected onto the screen 20. On the other hand, the projection light beam 142 is reflected by the second mirror 10, passes through the position of light condensation 15, and subsequently impinges on a first mirror 9 and is subjected to vignetting. In such a case, a portion of an image which should be displayed on the screen 20 by the projection light beam 14 may be lacking. Hence, it is considered that it is desirable for the position of light condensation 15 to be near the first mirror 9.

If the position of light condensation 15 is not near the first mirror 9 but is remote from the first mirror 9 and close to the second mirror 10, a portion of the projection light beam 14 may be subjected to vignetting by the projection optical system so that it may not be possible to display a large format image on the screen 20. Hence, the position of light condensation 15 is set at a position far forward of the screen 20 and close to the second mirror 10 and near the first mirror 9 in a projector 100 according to the present practical example. Thereby, it may be possible to conduct a large format image display even at an ultra-short distance.

Furthermore, when the position of light condensation 15 is not near the first mirror 9 but is close to the second mirror 10 as illustrated in FIG. 6, the projection light beam 142 which is a portion of the projection light beam 14 is inclined downward by an angle to the screen 20 which is parallel to an X-Z plane compared to the projection light beam 141 arriving at the screen 20. In other words, when an angle of one edge portion (projection light beam 141) in the projection light beam 14 reflected from the second mirror 10 with respect to a normal line of the screen 20 and an angle of an edge portion at an opposite side (projection light beam 142) with respect to a normal lire of the screen 20 are angles with different signs, the projection light beam 14 may be subjected to vignetting by a lens optical system 8.

Hence, in the projector 100 according to the present practical example, angles of light rays incident on centers of images in left and right directions in relation to the projection light beam 14 projected onto the screen 20 being a surface to be projected onto with respect to a normal line of the screen 20 are all angles with an identical sign.

Practical Example 2

Next, another practical example of an image displaying apparatus according to an embodiment of the present invention will be described with a focus on a part(s) different from that/those of the practical example described previously.

Figure 7:
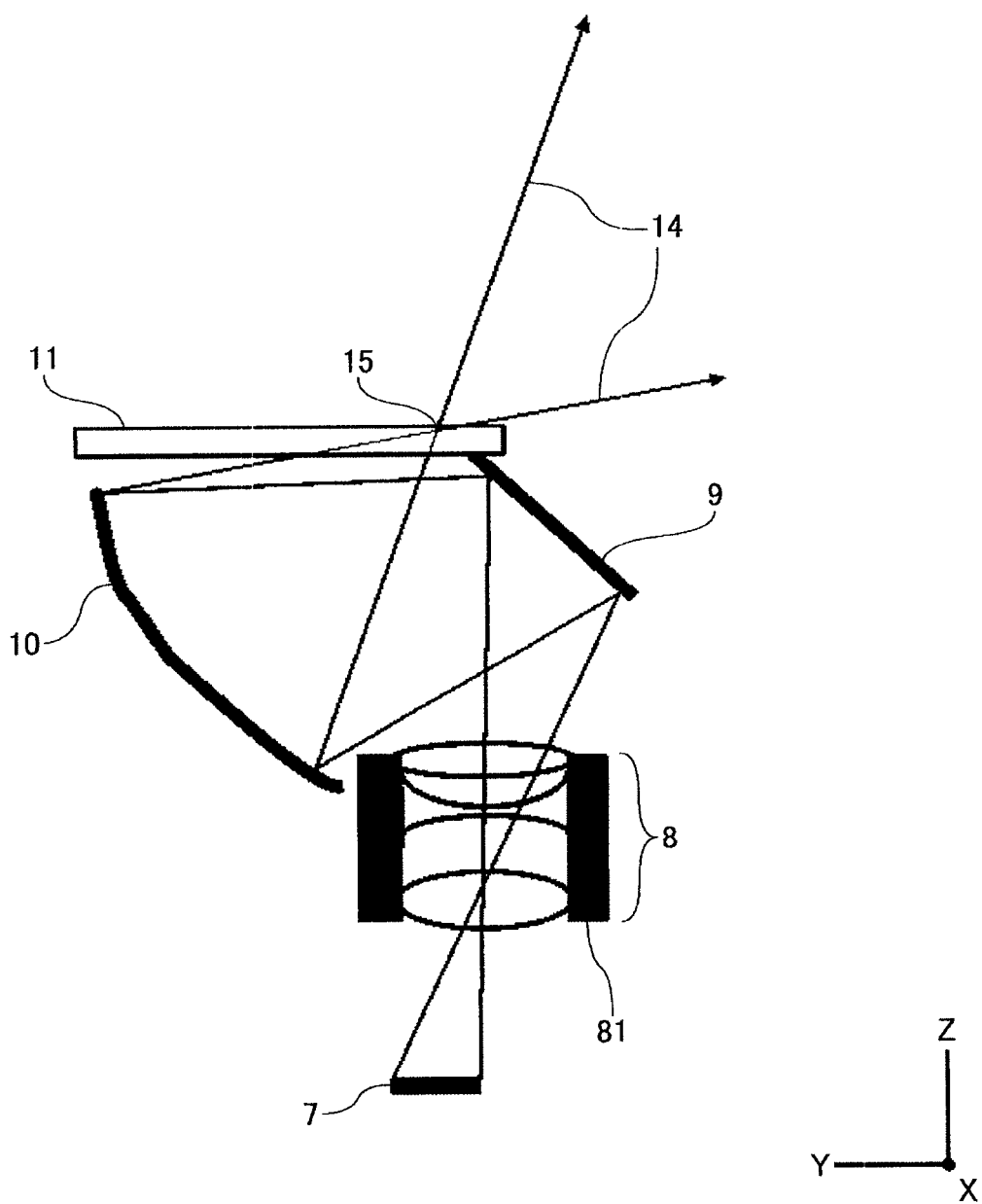
FIG. 7 is an enlarged view of an essential part of a projection optical system illustrating another practical mode of an image displaying apparatus according to an embodiment of the present invention.

FIG. 7 is an enlarged view of an essential part of a projection optical system in the present practical example which is configured to add a dust-proof glass 11 to a projection optical system as illustrated in Practical example 1.

The dust-proof glass 11 is placed above a top of a second mirror 10, that is, on an optical path of a light ray reflected from the second mirror and directed to a screen 20 for the purpose of protection of the second mirror 10 which is a concave mirror or preventing contaminant from contaminating a lens optical system 8. It may be possible to prevent contaminant from contaminating the lens optical system 8 by installing the dust-proof glass 11, and hence, it may be possible to reduce degradation of quality of a projection image (a display image on the screen 20).

Additionally, it is desirable for the dust-proof glass 11 to be as compact as possible. That is because when the dust-proof glass 11 is large, an overall size of the projection optical system may be large and the projector 100 may be large.

A projection light beam 14 reflected from the second mirror 10 and directed to the screen 20 (which is not illustrated in the figure) is first condensed and subsequently diffused. Herein, a position of light condensation 15 may be near the dust-proof glass 11 in order to attain prevention of contamination with contaminant, etc., as described above, without increasing the size of the dust-proof glass 11. As illustrated in FIG. 7, when the position of light condensation 15 is near the dust-proof glass 11, it may be unnecessary to increase the size of the dust-proof glass 11 and it may be possible to provide a compact projection optical system.

In order to attain the three points described above, that is, the projection light beam 14 directed from the second mirror 10 to the screen 20 being not subjected to vignetting, a compact projection optical system being provided which includes the lens optical system 8, a first mirror 9, and the second mirror 10, and a compact dust-proof glass 11 being provided, it is desirable for the position of light condensation 15 to be a position far forward of the screen 20 and close to the second mirror 10, a position closer to the first mirror than the second mirror, and a position close to the dust-proof glass 11.

Figure 8:
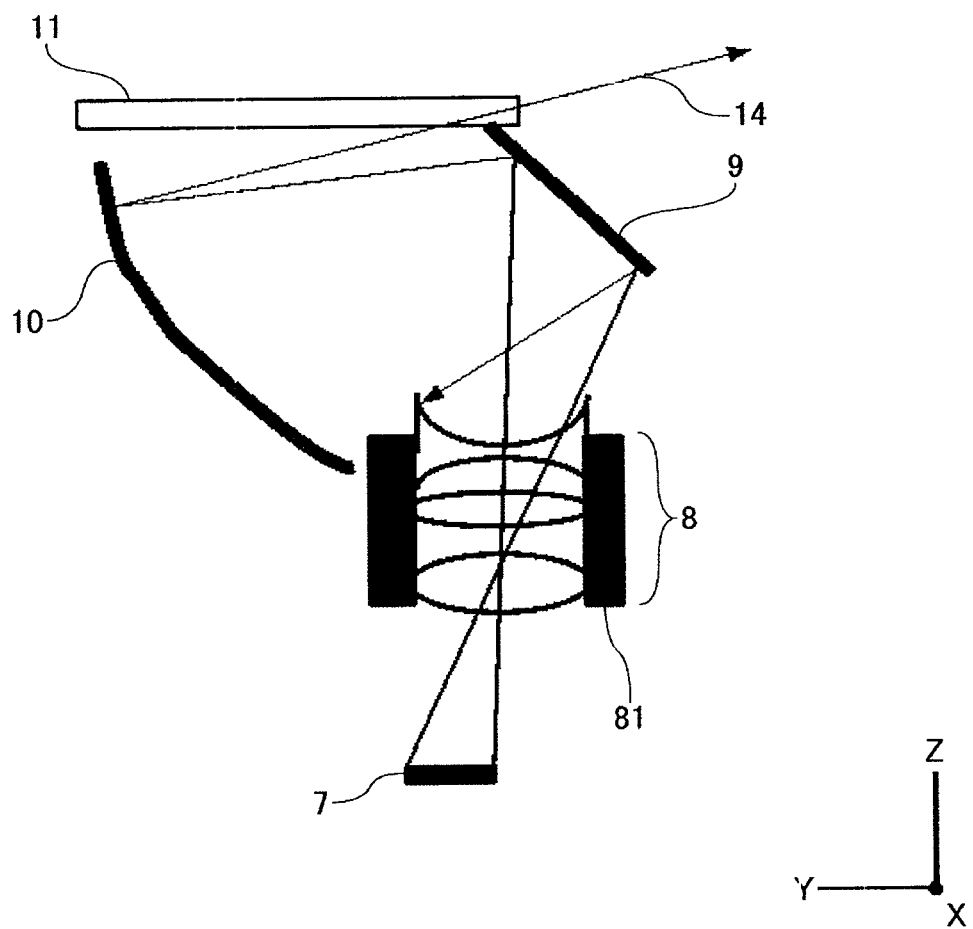
FIG. 8 is an enlarged view of an essential part of a projection optical system in a comparative example for an image displaying apparatus according to an embodiment of the present invention.

FIG. 8 is an enlarged view of an essential part of a projection optical system in a comparative example for an image displaying apparatus according to an embodiment of the present invention, and illustrates a case where a lens surface of a lens arranged at a position closest to a first mirror 9 among plural lenses constituting a lens optical system 8 is a concave surface. In a case of such a configuration of the comparative example, a light beam passing nearest the lens optical system 8 among light beams reflected from the first mirror 9 may be incident on the concave surface described above so that it may not be possible to arrive at a second mirror 10.

Figure 9:
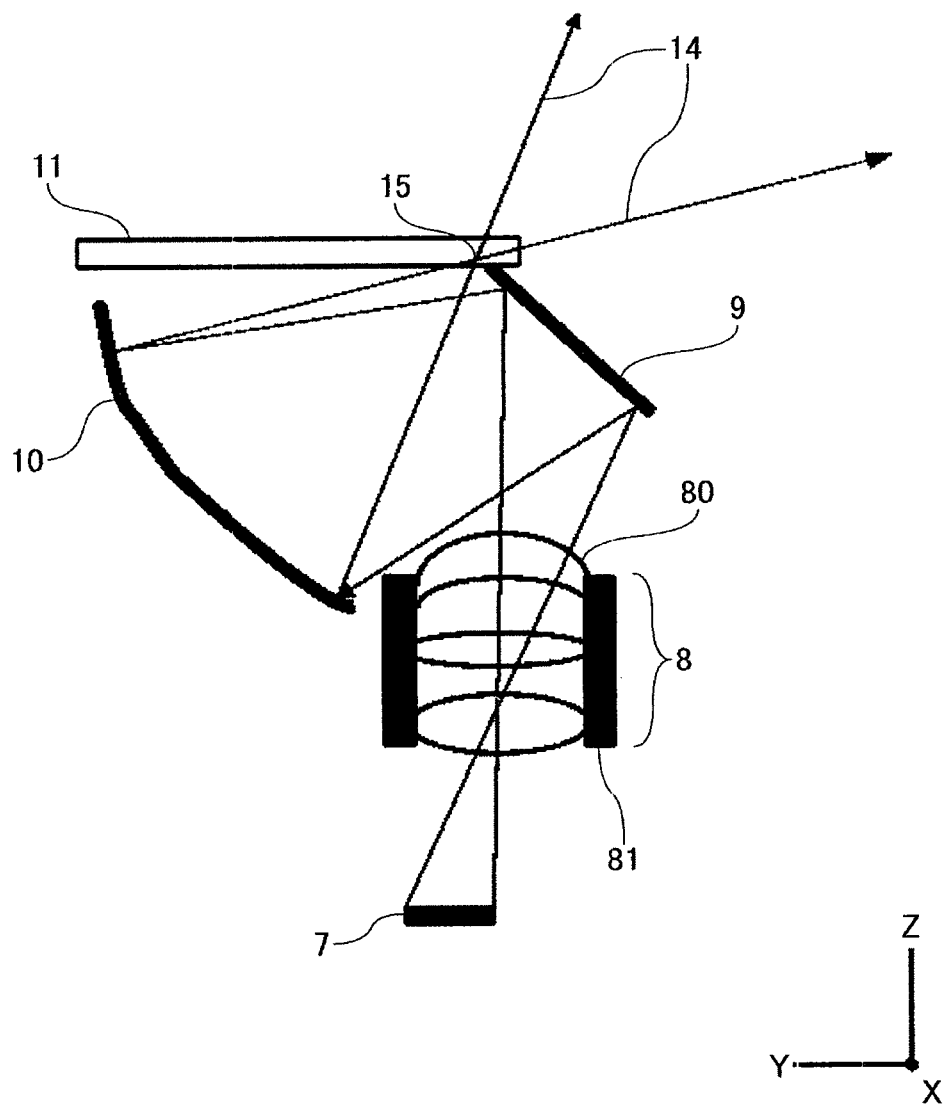
FIG. 9 is an enlarged view of an essential part illustrating yet another example of a projection optical system in an image displaying apparatus according to an embodiment of the present invention.

Hence, in order to provide a compact image displaying apparatus capable of displaying a large format image, ft is desirable for a lens surface of a lens 80 arranged at a position closest to a first mirror 9 among plural lenses constituting a lens optical system 8 to be a convex surface as illustrated in FIG. 9. As a lens surface of the lens 80 is a convex surface, even a light beam reflected from the first mirror 9 and passing near the lens optical system 8 may not be subjected to vignetting by a peripheral portion of the lens 80 or a top end of a lens barrel 81. Accordingly, even if a light beam reflected from the first mirror 9 is a light beam with a large divergence, it may be possible to reach the second mirror 10.

Furthermore, as a lens surface of the lens 80 closest to the first mirror 9 among plural lenses constituting the lens optical system 8 is a convex surface, contaminant, etc., may not be deposited on a lens surface of the lens 80 but instead may readily fall even if such contaminant, etc., enters an inside of a housing. As a result, it may be possible to prevent or reduce degradation of image quality of a display image on a screen 20.

Practical Example 3

Next, yet another practical example of an image displaying apparatus according to an embodiment of the present invention will be described with focus on a part(s) different from that/those of the practical example(s) described above.

Figure 10:
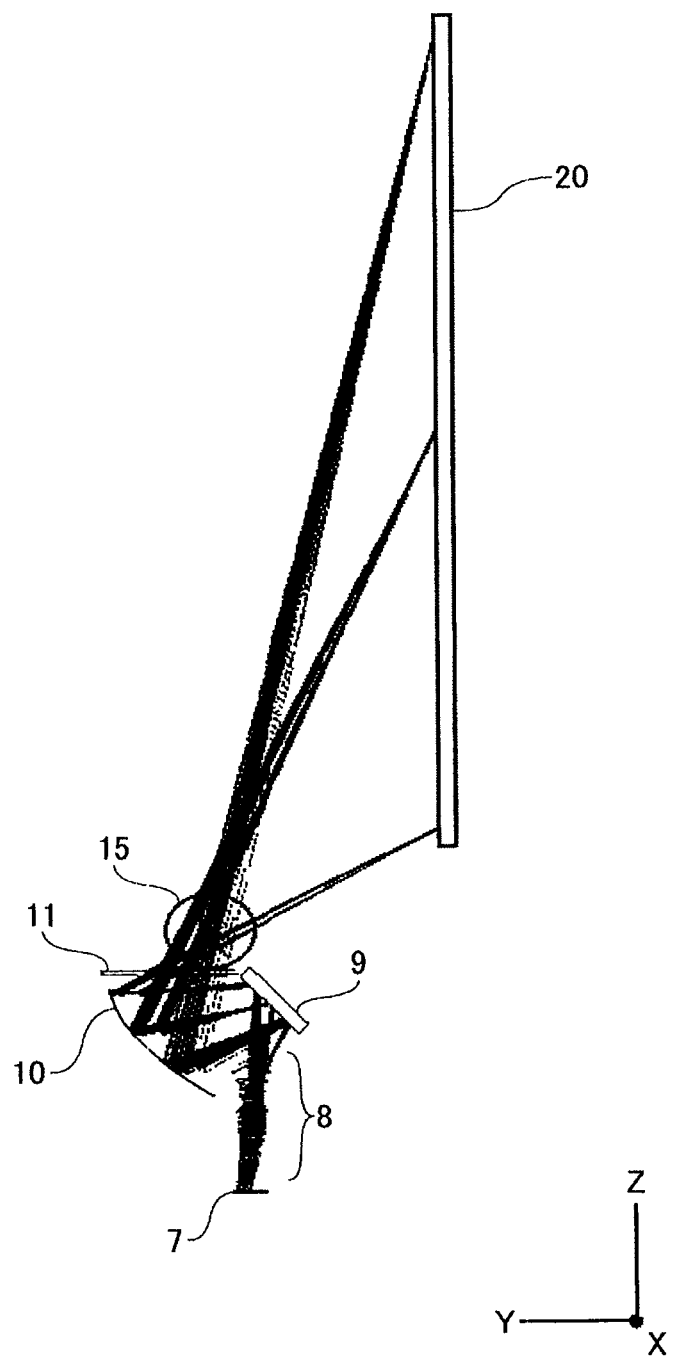
FIG. 10 is a light ray diagram illustrating a trajectory of light projected by a projection optical system, which illustrates yet another practical mode of an image displaying apparatus according to an embodiment of the present invention.

FIG. 10 is a light ray diagram illustrating a trajectory of light to be projected by a projection optical system composed of a lens optical system 8, a first mirror 9, a second mirror 10, and a dust-proof glass 11 arranged to attain an optimum position of light condensation 15. The same figure illustrates an aspect in which light from a DMD 7 is incident on the lens optical system 8, reflected by the first mirror 9 (plane mirror), subsequently reflected by the second mirror 10 (concave free-form surface), transmitted through the dust-proof glass 11, and reaches a screen 20.

Figure 11:
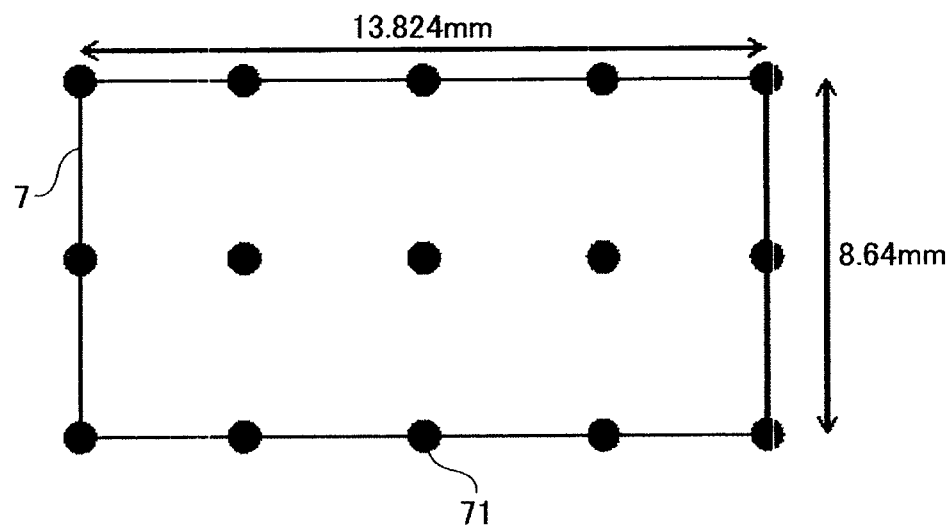
FIG. 11 is a plan view of a reflective image displaying device included in the image displaying apparatus in FIG. 10.
Figure 11:
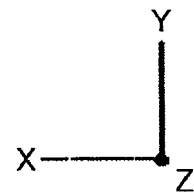

Herein, as illustrated in FIG. 11, which is a plane view of a DMD 7, the DMD 7 emanates seven light rays from each of fifteen points on the DMD 7. Among plural points on a plane of the DMD 7, a point 71 which is a middle point in a direction of an X-axis and a bottom point in a direction of a Y-axis is decentered in the direction of a Y-axis. An amount of decentering thereof is 1.56 mm.

Returning to FIG. 10 is made. A degree of light condensation at the position of light condensation 15 may not so be small as to be soot-like but it may be possible to provide a compact projection optical system by arranging the dust-proof glass 11 near the position of light condensation 15.

Furthermore, the position of light condensation 15 is provided near the first mirror 9, in particular, near an infinitely wide virtual plane including a reflection surface of the first mirror 9, whereby a projection light beam may not be subjected to vignetting by the first mirror 9. Furthermore, a distance between the first mirror 9 and the second mirror 10 may not be large, and hence, it may be possible to provide a compact projection optical system.

Herein, in a case of a projector with a projection optical system arranged in such a manner that the projection light beam 14 having passed through the lens optical system 8 impinges the second mirror 10 without being folded by the first mirror 9, a housing of a projector body may collide with the screen 20 if the projection optical system is arranged on an exterior package. That is, it may be necessary to provide a configuration such that a projection light beam having a large divergence is reflected by using the first mirror 9 and the second mirror 10 and projected onto the screen 20, like a projector according to an embodiment of the present invention, in order to attain projection at an ultra-short distance.

Figure 12:
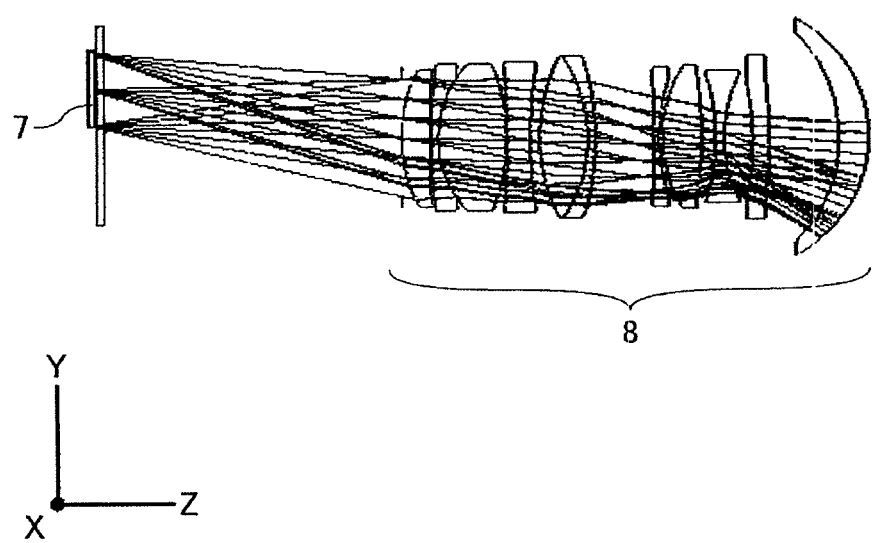
FIG. 12 is an optical arrangement diagram of a lens optical system included in the image displaying apparatus in FIG. 10.

FIG. 12 is an optical arrangement diagram illustrating an example of a configuration of a lens optical system 8. In FIG. 12, a direction of an optical axis off a lens (left or right direction on a plane of paper is a Z-axis and two axes orthogonal thereto are an X-axis and a Y-axis (up and down directions on a plane of paper being a Y-axis). The lens optical system 8 illustrated in FIG. 12 is a coaxial optical system in which an optical axis of each lens constituting the lens optical system 8 is coincident on overlaps with) an identical straight line.

The optical axis of the lens optical system 8 and the bottom point 71 in a direction of a Y-axis among plural points present on the plane of the DMD 7 illustrated in FIG. 11 are decentered in a direction of a Y-axis and an amount of decentering thereof is 1.56 mm. That is, in FIG. 12, the optical axis of the lens optical system 8 is by 1.56 mm below a bottom edge of the DMD 7 (the plane of the paper).

The lens optical system 8 in the present practical example is not telecentric at a side of the DMD 7. That is, the lens optical system 8 is a non-telecentric optical system at a position of an entrance pupil thereof. Due to such a configuration, it may be possible to decrease a lens diameter at a side of the DMD 7, and hence, it may be possible to provide a compact projector 100.

Next, a specific example of numerical values for a projection optical system will be presented.

Table 1 illustrates a configuration of a coaxial optical system as described above.

TABLE 1

| Surface number | Radius of curvature | Distance | Refractive index & Abbe number |
|---|---|---|---|
| 0(DMD) | 1.0E+18 | 1.110 | |
| 1 | 1.0E+18 | 1.050 | 1.516798 64.10 |
| 2 | 1.0E+18 | 37.511 | |
| 3(stop) | 1.0E+18 | 0.000 | |
| 4 | 21.0616 | 3.589 | 1.517600 63.5 |
| 5 | −1.3E+02 | 0.100 | |
| 6 | 60.9542 | 0.900 | 1.883000 40.80 |
| 7 | 12.3278 | 8.525 | 1.487489 70.44 |
| 8 | −21.7193 | 0.100 | |
| 9 | −80.7180 | 2.900 | 1.719013 30.84 |
| 10 | 52.5721 | 1.192 | |
| 11 | 20.2544 | 6.018 | 1.581810 41.17 |
| 12 | −16.4629 | 0.973 | 1.904000 31.30 |
| 13 | −29.4138 | 7.280 | |
| 14 | 1.0E+18 | 0.000 | |
| 15 | −737.0756 | 0.900 | 1.502194 68.83 |
| 16 | 24.0244 | 0.300 | |
| 17 | 15.2620 | 5.000 | 1.706797 29.84 |
| 18 | −47.7023 | 1.745 | |
| 19 | −23.6586 | 1.100 | 1.904000 31.30 |
| 20 | 15.5688 | 3.698 | |
| 21 | −20.2538 | 2.100 | 1.531590 55.8 |
| 22 | −35.7110 | 8.680 | |
| 23 | −17.2048 | 3.763 | 1.531590 55.8 |
| 24 | −14.6151 | 24.770 | |

| Surface number | Aperture radius | Decentering Y (LB end portion-optical axis) | Aspheric surface |
|---|---|---|---|
| 0(DMD) | | 0 | |
| 1 | | 0 | |
| 2 | | 0 | |
| 3(stop) | 7 | −1.560 | |
| 4 | | −1.560 | • |
| 5 | | −1.560 | • |
| 6 | | −1.560 | |
| 7 | | −1.560 | |
| 8 | | −1.560 | |
| 9 | | −1.560 | |
| 10 | | −1.560 | |
| 11 | | −1.560 | |
| 12 | | −1.560 | |

TABLE 1-continued

| | | |
|---|---|---|
| 13 | | −1.560 |
| 14 | | −1.560 |
| 15 | 7.4 | −1.560 |
| 16 | 7.4 | −1.560 |
| 17 | 9.1 | −1.560 |
| 18 | 9.1 | −1.560 |
| 19 | | −1.560 |
| 20 | | −1.560 |
| 21 | | −1.560 • |
| 22 | | −1.560 • |
| 23 | | −1.560 • |
| 24 | | −1.560 • |

In Table 1, surfaces 4, 5, 21, 22, 23, and 24 are aspheric surfaces and aspheric surface coefficients thereof are presented in Table 2.

TABLE 2

| | Surface number | | |
|---|---|---|---|
| | 4 | 5 | 21 |
| 4th order coefficient (E4) | 7.416275E−05 | 8.857986E−05 | 1.252837E−04 |
| 6th order coefficient (E6) | 2.074740E−07 | 2.750710E−07 | 2.866321E−06 |
| 8th order coefficient (E8) | 5.274898E−09 | 2.760577E−09 | −1.166681E−07 |
| 10th order coefficient (E10) | −1.666298E−11 | 4.115343E−11 | 2.492616E−09 |
| 12th order coefficient (E12) | −1.657250E−13 | −8.274800E−13 | −2.776107E−07 |
| 14th order coefficient (E14) | 7.852351E−15 | 1.252620E−14 | 1.615320E−13 |
| 16th order coefficient (E16) | 2.855639E−17 | 7.065636E−17 | −3.215843E−16 |

| | Surface number | | |
|---|---|---|---|
| | 22 | 23 | 24 |
| 4th order coefficient (E4) | 8.609800E−05 | 2.515713E−05 | 2.590017E−05 |
| 6th order coefficient (E6) | 2.375690E−07 | −1.000793E−06 | −6.238096E−07 |
| 8th order coefficient (E8) | −1.629372E−08 | 8.705097E−09 | 1.014559E−08 |
| 10th order coefficient (E10) | 2.036335E−10 | −1.899131E−11 | −1.315813E−10 |
| 12th order coefficient (E12) | −6.003102E−13 | −8.301279E−14 | 1.169057E−12 |
| 14th order coefficient (E14) | −4.683342E−15 | −3.504498E−17 | −5.487696E−15 |
| 16th order coefficient (E16) | 3.675703E−17 | 2.511070E−18 | 1.055394E−17 |

A formula for calculating an aspheric surface by applying aspheric surface coefficients as described above thereto is expressed in formula 1.

$$D = \frac{C \cdot H^2}{1 + \sqrt{1 - (1+K) \cdot C^2 \cdot H^2}} + E_4 \cdot H^4 + E_6 \cdot H^6 + E_8 \cdot H^8 + E_{10} \cdot H^{10} + \ldots \quad \text{(Formula 1)}$$

Coefficients for forming a reflection surface of a second mirror 10 are presented in Table 3. Additionally, in Table 3, "**" indicates an exponentiation operation. Furthermore, "*" indicates multiplication.

TABLE 3

| C | 0 |
|---|---|
| κ: Conic constant | 0 |
| C2: y | 0 |
| C3: x**2 | 5.866757E−03 |
| C4: y**2 | 2.318685E−03 |
| C5: x**2*y | 3.439305E−05 |
| C6: y**3 | 3.716809E−06 |
| C7: x**4 | 2.096684E−07 |
| C8: x**2*y**2 | 4.725012E−07 |
| C9: y**4 | 9.431793E−08 |
| C10: x**4*y | 3.970253E−09 |
| C11: x**2*y**3 | 5.751713E−09 |
| C12: y**5 | −1.826627E−09 |
| C13: x**6 | −1.214379E−10 |
| C14: x**4*y**2 | 7.999683E−12 |
| C15: x**2*y**4 | −1.030515E−10 |
| C16: y**6 | 1.569398E−10 |
| C17: x**6*y | −4.117673E−12 |
| C18: x**4*y**3 | −1.998693E−12 |
| C19: x**2*y**5 | 4.163005E−12 |
| C20: y**7 | −3.742220E−12 |
| C21: x**8 | 1.020483E−13 |
| C22: x**6*y**2 | −3.119203E−14 |
| C23: x**4*y**4 | 1.398034E−13 |
| C24: x**2*y**6 | −2.348514E−14 |
| C25: y**8 | −4.532417E−14 |
| C26: x**8*y | 3.112801E−15 |
| C27: x**6*y**3 | 2.734611E−15 |
| C28: x**4*y**5 | −1.128068E−15 |
| C29: x**2*y**7 | 3.398303E−15 |
| C30: y**9 | 2.408328E−15 |
| C31: x**10 | −4.869393E−17 |
| C32: x**8*y**2 | 5.954255E−17 |
| C33: x**6*y**4 | −8.527970E−18 |
| C34: x**4*y**6 | −2.256822E−16 |
| C35: x**2*y**8 | 5.966575E−18 |
| C36: y**10 | 1.649588E−17 |
| C37: x**10*y | −1.052684E−18 |
| C38: x**8*y**3 | −2.459156E−18 |
| C39: x**6*y**5 | −9.174022E−19 |
| C40: x**4*y**7 | 3.612815E−18 |
| C41: x**2*y**9 | −5.350218E−18 |
| C42: y**11 | −8.824203E−19 |
| C43: x**12 | 1.298263E−20 |
| C44: x**10*y**2 | −3.046637E−20 |
| C45: x**8*y**4 | −2.306291E−20 |
| C46: x**6*y**6 | 1.630150E−19 |
| C47: x**4*y**8 | 3.886851E−21 |
| C48: x**2*y**10 | 9.864038E−20 |
| C49: y**12 | −8.426835E−21 |
| C50: X**12*y | 1.460937E−22 |
| C51: x**10*y**3 | 1.095031E−21 |
| C52: x**8*y**5 | 5.236515E−22 |
| C53: x**6*y**7 | −3.033300E−21 |
| C54: x**4*y**9 | 1.637244E−21 |
| C55: x**2*y**11 | 2.495311E−22 |
| C56: y**13 | 4.066596E−22 |
| C57: x**14 | −1.461270E−24 |
| C58: x**12*y**2 | 5.275013E−24 |
| C59: x**10*y**4 | 4.335473E−24 |
| C60: x**8*y**6 | −2.725007E−23 |
| C61: x**6*y**8 | 2.048197E−24 |
| C62: x**4*y**10 | −4.990440E−23 |
| C63: x**2*y**12 | −1.759478E−23 |
| C64: y**14 | −3.611435E−24 |

TABLE 3-continued

| | |
|---|---|
| C65: x**14*y | −3.771134E−27 |
| C66: x**12*y**3 | −1.804780E−25 |
| C67: x**10*y**5 | 7.697891E−28 |
| C68: x**8*y**7 | 3.427100E−25 |
| C69: x**6*y**9 | 1.715807E−25 |
| C70: x**4*y**11 | 3.498456E−25 |
| C71: x**2*y**13 | 1.057061E−25 |
| C72: y**15 | 8.925445E−27 |

A formula for calculating the reflection surface of a second mirror 10 by applying coefficients as described above thereto is expressed in formula 2.

$$z = \frac{cr^2}{1 + SQRT[1 - (1+k)c^2 r^2]} + \sum_{j=2}^{72} c_j x^m y^n \quad \text{(Formula 2)}$$

Herein,
z an amount of sag of a plane parallel to a z-axis
c a curvature at an apex (CUY)
k a conic constant
$c_j$ a coefficient of a monomial formula of $x^m y^n$.
A layout of a first mirror 9, a second mirror 10, and a dust-proof glass 11 is illustrated in Table 4.

TABLE 4

A reference of a surface apex of a lens surface closest to a first mirror

| | X | Y | Z | α |
|---|---|---|---|---|
| First mirror (plane mirror) | 0 | 0 | 59.7697 | −45 |
| Second mirror (concave mirror) | 0 | 55 | −5.5303 | −39.7 |
| Dust-proof glass first surface | 0 | 55 | 62.7697 | 0 |
| Dust-proof glass second surface | 0 | 55 | 65.7697 | 0 |
| Screen | 0 | −130 | | −90 |

According to a projector 100 having a configuration illustrated above, it may be possible to display a large format image on a screen 20 in spite of an ultra-short throw with a throw ratio of 0.3 or less. Additionally, a throw ratio in the example of numerical values described above is 0.23. Herein, a throw ratio is a value calculated by "a projection distance a length of a screen in a lateral direction thereof" in a front-projection-type projector, and indicates that when such a value is small, projection is conducted at a short distance.

[Appendix]
<An Illustrative Embodiment(s) of an Image Displaying Apparatus>
At least one illustrative embodiment of the present invention may relate to an image displaying apparatus for enlarging and displaying on a screen surface, etc., a projection original image.
An object of at least one illustrative embodiment of the present invention may be to provide an image displaying apparatus capable of miniaturizing such an apparatus and capable of reducing degradation of a display image.

At least one illustrative embodiment of the present invention may be an image displaying apparatus including a light source, an image displaying element for controlling exiting of incident light to display an image, an illumination optical system for illuminating the image displaying element with light exiting from the light source, and a projection optical system for projecting an image displayed on a display surface of the image displaying element onto a surface to be projected onto, to provide an enlarged display, characterized in that the display surface of the image displaying element and the surface to be projected onto are generally orthogonal, the projection optical system includes a lens optical system, a first mirror for reflecting light transmitted through the lens optical system, and a second mirror for reflecting light reflected from the first mirror toward the surface to be projected onto, the lens optical system images an intermediate image on an optical path between the image displaying element and the surface to be projected onto, either one mirror of the two mirrors is set to be interposed by the intermediate image, and the mirror interposed by the intermediate image is arranged in such a manner that an optical surface thereof faces in a vertically downward direction.

Illustrative embodiment (1) is an image displaying apparatus including a light source, an image displaying element for controlling exiting of incident light to display an image, an illumination optical system for illuminating the image displaying element with light exiting from the light source, and a projection optical system for projecting an image displayed on a display surface of the image displaying element onto a surface to be projected onto, to provide an enlarged display, wherein the image displaying apparatus is characterized in that the display surface of the image displaying element and the surface to be projected onto are generally orthogonal, wherein the projection optical system includes a lens optical system, a first mirror for reflecting light transmitted through the lens optical system, and a second mirror for reflecting light reflected from the first mirror toward the surface to be projected onto, wherein the lens optical system images an intermediate image on an optical path between the image displaying element and the surface to be projected onto, wherein either one mirror of the two mirrors is set to be interposed by the intermediate image, and wherein the mirror interposed by the intermediate image is arranged in such a manner that an optical surface thereof faces in a vertically downward direction.

Illustrative embodiment (2) is the image displaying apparatus as described in Illustrative embodiment (1), wherein a lens surface of a lens closest to the first mirror among plural lenses constituting the lens optical system is a convex surface.

Illustrative embodiment (3) is the image displaying apparatus as described in Illustrative embodiment (1), wherein the mirror interposed by the intermediate image is a plane mirror.

Illustrative embodiment (4) is the image displaying apparatus as described in Illustrative embodiment (1), wherein the mirror interposed by the intermediate image is the first mirror.

Illustrative embodiment (5) is the image displaying apparatus as described in Illustrative embodiment (1), wherein a non-telecentric optical system is at a position of an entrance pupil of the lens optical system.

According to at least one illustrative embodiment of the present invention, it may be possible to conduct miniaturization of a body and it may be possible to reduce degradation of a display image.

Although the illustrative embodiment(s) and specific example(s) of the present invention have been described with reference to the accompanying drawings, the present invention is not limited to any of the illustrative embodiment(s) and specific example(s) and the illustrative embodiment(s) and specific example(s) may be altered, modified, or combined without departing from the scope of the present invention.

The present application claims the benefit of priority based on Japanese Patent Application No. 2011-238707 filed on Oct. 31, 2011, the entire content of which is hereby incorporated by reference herein.

What is claimed is:

1. An image displaying apparatus comprising:
   a light source;
   an image displaying element configured to control exiting of incident light to display an image;
   an illumination optical system configured to illuminate the image displaying element with light exiting from the light source; and
   a projection optical system configured to project an image displayed on a display surface of the image displaying element onto a surface to be projected onto, to provide an enlarged display,
      wherein the projection optical system includes a leas optical system, a first mirror configured to reflect light transmitted through the lens optical system, and a second mirror configured to reflect light reflected from the first mirror toward the surface to be projected onto,
      wherein one of the first mirror and the second mirror is arranged so that at least a part of an optical surface of said one of the first mirror and the second mirror is present at a position that is conjugate to the image displaying element,
      wherein the optical surface of the one mirror is arranged to face a vertically downward direction, and wherein light condensation of the light reflected from the second mirror towards the surface to be projected onto is at a position proximate to a contamination barrier and the first mirror.

2. The image displaying apparatus as claimed in claim 1, wherein the display surface of the image displaying element and the surface to be projected onto are generally mutually orthogonal.

3. The image displaying apparatus as claimed in claim 1, wherein a lens surface of a lens closest to the first mirror among plural lenses constituting the lens optical system is a convex surface.

4. The image displaying apparatus as claimed in claim 1, wherein the one mirror arranged at a position conjugate to the image displaying element is a plane mirror.

5. The image displaying apparatus as claimed in claim 1, wherein the one mirror arranged at a position conjugate to the image displaying element is the first mirror.

6. The image displaying apparatus as claimed in claim 1, wherein a non-telecentric optical system is provided at a position of an entrance pupil of the lens optical system.

7. The image displaying apparatus as claimed in claim 1, wherein the projection optical system configured to project the image and provide the enlarged display has a throw ration of about 0.3 or less.

8. The image displaying apparatus as claimed in claim 1, wherein the contamination barrier is configured to transmit light reflected from the second mirror toward the surface to be projected onto, the contamination barrier being disposed adjacent to an end of the first mirror.

* * * * *